United States Patent
Wetherell et al.

(10) Patent No.: US 9,579,764 B1
(45) Date of Patent: *Feb. 28, 2017

(54) LOW PH COMPOSITIONS FOR HARDENING CONCRETE AND ASSOCIATED METHODS

(71) Applicant: ARRIS TECHNOLOGIES, LLC, Bondurant, WY (US)

(72) Inventors: Mark Wetherell, Henderson, NV (US); Dal N. Hills, Midway, UT (US); Kent Barrus, Provo, UT (US)

(73) Assignee: ARRIS TECHNOLOGIES, LLC, Bondurant, WY (US)

(*) Notice: Subject to any disclaimer, the term of this patent is extended or adjusted under 35 U.S.C. 154(b) by 164 days.

This patent is subject to a terminal disclaimer.

(21) Appl. No.: 13/794,516

(22) Filed: Mar. 11, 2013

Related U.S. Application Data

(63) Continuation-in-part of application No. 12/366,584, filed on Feb. 5, 2009.

(60) Provisional application No. 61/027,366, filed on Feb. 8, 2008, provisional application No. 61/026,427, filed on Feb. 5, 2008, provisional application No. 61/609,089, filed on Mar. 9, 2012.

(51) Int. Cl.
*B05D 3/12* (2006.01)
*B24B 7/22* (2006.01)

(52) U.S. Cl.
CPC ...................................... *B24B 7/22* (2013.01)

(58) Field of Classification Search
CPC .......... B24B 1/00; B24B 37/044; B24B 7/186
USPC .......................... 427/289, 421, 427; 106/600
See application file for complete search history.

(56) References Cited

U.S. PATENT DOCUMENTS

| | | |
|---|---|---|
| 3,083,167 A * | 3/1963 | Shannon ............... B01J 20/103 106/286.5 |
| 3,976,497 A | 8/1976 | Clark |
| 4,144,074 A | 3/1979 | Itoh et al. |
| 4,273,813 A | 6/1981 | Meddaugh |
| 4,330,446 A | 5/1982 | Miyosawa |
| 5,370,919 A | 12/1994 | Fieuws et al. |
| 5,431,852 A | 7/1995 | Kaijou |
| 5,584,921 A | 12/1996 | Wagner et al. |
| 5,895,688 A | 4/1999 | Bertoncini et al. |
| 5,932,000 A | 8/1999 | Bergqvist et al. |
| 5,945,169 A | 8/1999 | Netti et al. |
| 6,187,851 B1 | 2/2001 | Netti et al. |
| 6,454,632 B1 * | 9/2002 | Jones et al. ................ 451/28 |
| 6,800,130 B2 | 10/2004 | Greenwood et al. |
| 7,608,143 B2 | 10/2009 | Brown |
| 7,732,497 B2 | 6/2010 | Cumberland et al. |
| 8,092,588 B2 | 1/2012 | Bowers |
| 8,852,334 B1 * | 10/2014 | Hills .................. C04B 28/02 106/600 |
| 2006/0178463 A1 | 8/2006 | Sacks |
| 2007/0129478 A1 | 6/2007 | Nakamura et al. |
| 2008/0081217 A1 | 4/2008 | Bowers |
| 2008/0261024 A1 | 10/2008 | Xenopoulos et al. |
| 2009/0050018 A1 | 2/2009 | Kishimoto |
| 2009/0142604 A1 | 6/2009 | Imai et al. |
| 2009/0169750 A1 | 7/2009 | Wilkins et al. |
| 2011/0111216 A1 | 5/2011 | Bowers |

OTHER PUBLICATIONS

Roberts, William O. Manufacturing and Applications of Water-Borne Colloidal Silica, Colloidal Silica: Fundamentals and Applications, CRC Press, Surfactant Science Series vol. 131, 2006, p. 167.*

Xtreme Hard—Concrete Hardener and Densifier, Material Safety Data Sheet, Prepared Aug. 15, 2007, Revised Mar. 25, 2008.*

W.R.Meadows, Liqui-Hard Concrete Densifier and Chemical Hardener MSDS, Jan. 6, 2006, pp. 1-2.*

* cited by examiner

*Primary Examiner* — Kelly M Gambetta
(74) *Attorney, Agent, or Firm* — Durham Jones & Pinegar, P.C. Intellectual Property Law Group

(57) ABSTRACT

Systems and methods for treating concrete, which includes the steps of wetting a surface of concrete with a colloidal silica; cutting the softened surface to provide a cut surface; and polishing the cut surface.

20 Claims, No Drawings

LOW PH COMPOSITIONS FOR HARDENING CONCRETE AND ASSOCIATED METHODS

CROSS-REFERENCE TO RELATED APPLICATIONS

This application is a continuation-in-part of U.S. patent application Ser. No. 12/366,584, filed on Feb. 5, 2009, and titled LOW pH COMPOSITIONS FOR HARDENING CONCRETE AND ASSOCIATED METHODS ("the '584 Application"), now U.S. Pat. No. 8,852,334, issued Sep. 17, 2014, in which a claim for priority was made pursuant to 35 U.S.C. §119(e) to the Feb. 8, 2008 filing date of U.S. Provisional Patent Application No. 61/027,366, titled LOW pH COMPOSITIONS FOR HARDENING CONCRETE AND ASSOCIATED METHODS ("the '366 Provisional Application") and to the Feb. 5, 2008 filing date of U.S. Provisional Patent Application No. 61/026,427, titled LOW pH COMPOSITIONS FOR HARDENING CONCRETE AND ASSOCIATED METHODS ("the '427 Provisional Application"). A claim for priority is also made pursuant to 35 U.S.C. §119(e) to the Mar. 9, 2012 filing date of U.S. Provisional Patent Application No. 61/609,089, titled LOW pH COMPOSITIONS FOR HARDENING CONCRETE AND ASSOCIATED METHODS ("the '089 Provisional Application"). The entire disclosures of the '584 Application, the '366 Provisional Application, the '427 Provisional Application, and the '089 Provisional Application are hereby incorporated herein.

TECHNICAL FIELD

The present invention, in various embodiments, relates generally to chemical compositions and to methods for treating concrete, masonry, or stone, and, more specifically, to chemical compositions for hardening concrete, masonry, and stone that have a pH of less than 10, as well as to methods relating to the use of such compositions.

RELATED ART

When concrete hardens or cures, calcium hydroxide (Ca(OH)$_2$, or "free lime") forms in small "deposits" throughout the substrate. Calcium hydroxide is a soft, weak material. Deposits of calcium hydroxide that are present at surfaces of concrete can, over time, compromise the integrity of the concrete.

Various compounds are known to be useful for reacting with calcium hydroxide to harden concrete, masonry, and stone. These compounds include silicas, silicates, siliconates, and mixtures of silicates and siliconates. The silicas, silicates, and/or siliconates of these materials react chemically with soft, weak calcium hydroxide to form stronger materials, densifying and strengthening the treated surface.

Silicas, silicates, and siliconates are widely available in water-based, or aqueous, solutions. These solutions are typically alkaline, or basic, with a pH of 10 or more. The relatively high pH "stabilizes" these solutions by imparting the suspended silica, silicate, and/or siliconate particles with a negative, repulsive charge that prevents the particles from aggregating and, thus, from falling out of, or precipitating from, the solution. When the pH of a conventional hardening solution drops below 10 (e.g., to 8), the effective negative charge on the particles decreases. As a result, the particles no longer repel one another. Instead, they begin to aggregate and precipitate. Stated another way, the solution destabilizes. From the foregoing, it is apparent that conventional concrete hardeners remain stable over a relatively narrow pH range.

When conventional hardeners that have been applied to concrete, masonry, or stone surfaces puddle, they leave a hard, white residue that is difficult to remove, often requiring additional chemical treatments, scrubbing, scraping, sanding, polishing, or other labor-intensive processes. As a consequence, an undesirably significant amount of labor is often required to treat concrete, masonry, or stone with conventional hardeners.

SUMMARY

In one aspect, the present invention includes compositions for hardening concrete, masonry, or stone. For the sake of simplicity, the term "concrete," as used herein, includes concrete, masonry, stone, and other similar materials.

Some embodiments of the invention are directed to a method for finishing concrete, which includes the steps of: wetting a surface of concrete with a colloidal silica to impart the concrete with a softened surface; cutting the softened surface to provide a cut surface; and polishing the cut surface.

In some embodiments, the step of wetting the surface includes soaking the surface with the colloidal silica. Wetting may include wetting a surface of fully cured concrete, a stained surface, and/or a hardened surface of new concrete.

In some embodiments, the method further includes the step of soaking the surface with water or an aqueous solution before wetting the surface with the colloidal silica.

In some embodiments, the step of cutting the softened surface comprises grinding the softened surface.

In some embodiments, the method further includes the step of applying a densifier to the cut surface. The densifier may comprise colloidal silica which is applied to the cut surface. In other embodiments, the densifier comprises a metal silicate or a metal polysilicate applied to the cut surface.

In some embodiments, polishing is effected while the densifier wets the cut surface. The polishing may be repeated at least once with increasingly finer abrasives.

Some embodiments of the invention are also directed to a method for polishing concrete, comprising the steps of: applying a polishing composition to a surface of concrete; and mechanically polishing the surface of the concrete, the acts of applying and mechanically polishing being effected within about forty-eight hours after initially pouring wet concrete.

In some embodiments, applying the polishing composition may comprise applying a densifier to the surface of the concrete. Applying the densifier to the surface of the concrete may include applying a lithium-based densifier to the surface of the concrete, which may include at least one of a colloidal silica, a lithium polysilicate, and a lithium silicate. Alternatively, applying densifier may include application of a potassium silicate or a sodium silicate to the surface of the concrete.

In some embodiments, the step of applying the polishing composition to the surface of the concrete is effected before mechanically polishing the surface of the concrete.

In some embodiments, the step of mechanically polishing the surface of the concrete is effected while the surface is wetted by the polishing composition.

In some embodiments, the step of mechanically polishing comprises power troweling the surface of the concrete.

In some embodiments, the power troweling comprises applying finishing blades to the surface of the concrete, which may include orienting the finishing blades at an angle of about five degrees to about forty-five degrees to the surface of the concrete.

In some embodiments, the step of mechanically polishing comprises mechanically polishing the surface of the concrete in a first direction, and then mechanically polishing the surface of the concrete in a second direction, with the second direction being transverse to the first direction.

In some embodiments, the polishing method further comprises densifying the surface of the concrete after mechanically polishing the surface of the concrete.

In some embodiments, the method further comprises the step of further polishing the surface of the concrete with a non-abrasive polishing pad.

In some embodiments, mechanically polishing is effected when the surface of the concrete will support a combined weight of a polishing apparatus and an operator of the polishing apparatus.

In some embodiments, the aforementioned method imparts the surface of the concrete with a glossiness of at least about 70 gloss units.

Some embodiments of the invention are directed to a method for polishing concrete, comprising the steps of: applying a densifier to a hardened surface of new concrete; and power troweling the hardened surface while the hardened surface is wetted with the densifier.

Power troweling may include steps of moving a power trowel back and forth over the hardened surface in a first general direction; and moving the power trowel back and forth over the hardened surface in a second general direction, the second general direction being different from and transverse to the first general direction.

The invention is also directed to systems for effecting the aforementioned methods, which may include compositions such as those described herein and a power trowel.

Hardening compositions that incorporate teachings of the present invention include particles that remain in solution at, or stable over, a relatively low pH (e.g., at a pH of about 3, at a pH of about 3½, etc.), at a substantially neutral pH, or over a relatively large pH range (e.g., at a pH of about 4 to about 7, at a pH of about 3½ to about 10½, etc.). Due to the stability of such compositions at substantially neutral and lower pH values (e.g., at a pH of 8 or less), they are referred to herein as "low pH hardening compositions" or even more simply as "low pH compositions." The low pH of hardening compositions of the present invention may be due, at least in part, to their lack or substantial lack of alkaline materials, such as sodium or potassium or lithium.

In a specific embodiment, such a hardening composition includes particles (e.g., silica particles, etc.) and a stabilizer that comprises an aluminum compound (e.g., aluminum, aluminum oxide (alumina, or $Al_2O_3$, etc.). The aluminum compound may be present at or on portions of the surfaces of the particles. In addition to the particles and the stabilizer, the compound may include a surfactant (e.g., an anionic surfactant, a non-ionic surfactant, etc.).

Methods for formulating low pH hardening compositions are also within the scope of the present invention.

According to another aspect, the present invention includes methods for hardening concrete. Such methods may simply include application of a low pH hardening composition to fresh concrete or to fully cured concrete. In some embodiments, the low pH hardening composition may be applied to just before or while polishing the concrete.

In another aspect, the present invention includes methods for cleaning a surface of concrete following the application of a hardening composition to the surface. One embodiment of such a method consists essentially of sweeping, blowing, or spraying residue of the hardening composition from the surface of the concrete to substantially remove the residue from the surface.

Other aspects of the invention, as well as their features and advantages, will become apparent to those in the art through consideration of the ensuing description and the appended claims.

DETAILED DESCRIPTION

An embodiment of a hardening composition according to the present invention includes colloidal silica particles that are suspended in a water-based, or aqueous, solution. A stabilizer, which prevents aggregation of the silica particles and their precipitation from solution, may be present on the surfaces of the silica particles. The stabilizer may comprise an aluminum compound, such as aluminum or aluminum oxide. In addition to the water, the silica particles, and the stabilizer, the hardening composition may, in some embodiments, include a surfactant, which also facilitates suspension of the silica particles in the water.

The silica particles remain suspended in the hardening composition at a relatively low, substantially neutral (e.g., pH=6 to 8) or acidic pH. As an example, the silica particles may remain in solution at a pH of as low as about 3 or about 3½ and as high as about 10 or about 10½. In a more specific example, the pH of a hardening composition of the present invention may be about 4 to about 7. In another example, a hardening composition that incorporates teachings of the present invention may have a pH of about 3½ to about 7.

In various embodiments, the silica particles and stabilizer of a hardening composition may be provided as a colloidal silica suspension that includes silica particles having nominal sizes (e.g., diameters) of from about 3 nm to about 50 nm with an aluminum-based stabilizer.

The colloidal silica suspension available from Grace Davison of Columbia, Md., as LUDOX® HSA is an example of a colloidal silica suspension that falls within the scope of the teachings of the present invention. That colloidal silica includes a silica content of 29.0% to 31.0%, by weight of the solution, with a nominal particle size (e.g., diameter) of 12 nm and a pH of 3.5 to 5.0.

The colloidal silica suspension may comprise as little as about 5% of the weight of the hardening composition for application s in which the surface that is to be treated is dense, about 15% to about 20% of the weight of the hardening composition when the surface to be treated is new concrete, or as much as about 50% of the weight of the hardening composition when the surface to be treated is highly porous, as is often the case with old concrete. The amount of silica included in the hardening composition may be tailored to provide the desired treatment effect (e.g., hardening, polishing, etc.) without requiring an unnecessarily large number of applications (e.g., more than one application) and while minimizing the amount of residue that remains on a surface after treatment of the surface, or minimizing wastage of the silica. In some embodiments, the amount of silica may be tailored to leave no residue on the treated surface.

Embodiments of hardening compositions that include surfactants may include an anionic (i.e., negatively charged) surfactant, such as NIAPROOF® anionic surfactant 08 from Niacet Corporation of Niagara Falls, N.Y., or a non-ionic (i.e., no electrical charge) surfactant, such as the polyether siloxane copolymer available from Evonik Industries of Essen, North Rhine-Westphalia, Germany, as TEGO® Wet KL-245. The surfactant may account for as little as about 0.1% of the weight of the hardening composition, or as much as about 2% of the weight of the hardening composition.

Some embodiments of hardening compositions according to the present invention may altogether lack a surfactant.

The remainder, or balance, of the weigh t of a hardening composition of the present invention may comprise water.

A specific embodiment of hardening composition that incorporates teachings of the present invention includes 15%, by weight, LUDOX® HSA, 0.5%, by weight, non-ionic surfactant, with the balance (i.e., 84.5%, by weight) comprising water. Another specific embodiment of hardening composition includes 15%, by weight, LUDOX® HSA, 0.3%, by weight, anionic surfactant, with the balance (i.e., 84.7%, by weight) comprising water.

A hardening composition that incorporates teachings of the present invention may be applied to and allowed to penetrate into concrete. Application of the hardening composition may be effected by spraying, alone or in combination with brushing, or brooming, the hardening composition into the surface to which the hardening composition is applied. Of course, other suitable application techniques are also within the scope of the present invention.

In one embodiment of an application method according to the present invention, the hardening composition is applied to a surface of material (e.g., concrete) that has been substantially cured or fully cured. Prior to applying the hardening composition, any debris is cleared from the surface to which the hardening composition is to be applied. Additionally, that surface may be planed, honed, and/or polished (e.g., with a 100 grit (rougher) to 400 grit (finer) pad or polishing compound). The hardening composition may be applied before or during the polishing process. Polishing may occur following the application of hardening composition to the surface, and may continue until, and even after, the surface is dry.

In another embodiment of a hardening composition application method, the hardening composition may be applied to a surface of uncured (e.g., fresh) concrete. As an example, the hardening composition may be applied within thirty minutes following finishing of the surface of the concrete. In another example, the hardening composition may be applied within about three hours after the surface of the concrete has been finished. The hardening composition may be applied to the concrete surface just before or at about the same time as any curing compounds are applied to the surface of the concrete. After the concrete has cured, the surface may be polished.

Once a hardening composition according to the present invention has been applied to a surface, penetrated into the surface, and had an opportunity to provide the desired results (e.g., chemically react with calcium hydroxide) (i.e., the hardening composition has dried), residue of the hardening composition may be removed, or cleaned, from the treated surface. The residue, which consists primarily of silica particles, may be removed from the treated surface simply by sweeping, blowing, or spraying it from the treated surface. No additional chemical treatment or labor (e.g., scrubbing, sanding, scraping, polishing, etc.) are required.

Another exemplary embodiment comprises a hardening or densifying solution that may be used in connection with uncured concrete. Such a hardening or densifying solution may include colloidal silica and a fluid which exhibits hydrophobic properties when applied to the concrete. The colloidal silica in the solution may have a particle size which ranges from about 1 to about 10 nanometers, while in other embodiments, the colloidal silica has a particle size which ranges from about 3 nm to about 9 nm. The solution may further include one or more surfactants, and other ingredients may include water, disinfectants, and fragrances.

Upon application of such a hardening or densifying solution to uncured concrete, the solution penetrates the surface and at least an upper layer portion of the concrete, and thereafter facilitates cross-linking reactions by, among, and between, the colloidal silica, calcium hydroxide, and calcium silicate hydrate within the pore space of the uncured concrete. A result of these cross-linking reactions is an upper portion of the concrete with higher density, which also acts as a seal to retain the moisture within the concrete and promotes higher strength concrete, among other things.

A treatment method using such a hardening or densifying solution may include dispensing the solution and, optionally, a surfactant on a surface of the uncured concrete, and applying pressure, which may be via a power trowel, to the surface portion of the uncured concrete. The pressure may be between about 1 pound per square inch (psi) and about 500 psi or it may be between about 1 psi and about 5 psi. The application of pressure results in the reduction of the sizes of concrete particles on the surface of the uncured concrete to about the same size as or a similar size to the sizes of the silica particles of the colloidal silica. The surfactant is believed to help maintain surface moisture, which further facilitates cross-linking of colloidal silica particles with each other and with the resulting concrete particles or with dust generated by such a polishing method. Thus, such a polishing method results in a denser, more reflective or shiny surface upon drying or curing of the concrete than of concrete to which such a treatment method is not applied.

In some embodiments, the treatment method may involve spraying the solution during the last one or more, and possibly three, passes of the power trowel over a concrete slab after placement, while finishing the concrete slab. After finishing, the surface of the concrete slab may be sprayed again with a solution, as described herein, to prevent additional water from entering the concrete slab. Color may then be added, if desired, as soon as the solution has dried on the surface of the concrete slab. In some embodiments, a sealant may then be applied to the concrete slab. The sealant may include lithium silicate.

A solution including colloidal silica may be applied to the concrete slab at the time of placement of the concrete slab and in conjunction with finishing the concrete slab. The solution penetrates the uncured concrete slab and causes a silica layer to form on the surface. At least a portion of the surface of the concrete that remains uncured is power troweled as part of a finishing process, as described above. Since this is being done at the time of placement with equipment that is used to finish the surface of the uncured concrete slab, the blades of the power trowel touch every part of the surface. There is no transfer of color from the blades of the power trowel to the concrete slab because the blades are essentially contacting the layer of silica formed on the surface and therefore no discoloration of the uncured concrete slab occurs. There is also no waste or dust to dispose of, which disposal is typically required with concrete polishing, primarily since any concrete particles that have been milled or otherwise removed from the surface while power troweling the surface are added back to the surface and form a part of the concrete slab when it dries, as described above. Such a finishing process provides additional advantages over grinding and polishing processes used for concrete, which reduces the thickness of the surface layer, or "cream," of the concrete slab. The use of a solution according to this disclosure with a power trowel enables the cream at the surface of the concrete slab to remain intact and to retain its density.

The solution and the polishing methods described herein may be used with fresh, but dried, concrete slabs and with existing concrete slabs. In hardened or dried concrete slabs, the concrete will often have curled as it dried or cured. Typically, a higher ratio of cement requires more water, and the higher the ratio of water to cement, the greater the curl will be. Conventionally, in order to polish a hardened or dried surface of a concrete slab, conventional grinding and polishing processes were required, in which the hardened or densified concrete was cut to have a generally flat, planar surface. This often results in irregular exposure of aggregate at the surface of the concrete slab. Since such a finishing method is being done at the time of placement of the concrete slab and with the same equipment that would ordinarily be used to finish the concrete slab, the concrete slab will not have a chance to curl.

In existing concrete slabs, a solution such as those described herein may be used in a grinding and/or polishing process to polish the surface layer or "cream" of the concrete slab. Polishing this portion of the concrete slab is desirable as it is the wear layer of the concrete. It has the highest density of any portion of the concrete in the concrete slab and the highest percentage of calcium hydroxide. The nature of the solution allows for easier finishing without the addition of excessive amounts of water. Water added to the concrete at the time of placement results in weaker concrete that has a lower level of abrasion resistance and a higher rate of staining. The methods of the present invention improve the performance characteristics of the surface of the concrete slab.

In non-limiting tests of methods and compositions of the invention, as described herein, the resulting concrete slabs have been found to have uniform and reflective surfaces with no craze cracking. This is significant, as a curing compound had not been applied to these surfaces. The appearance of alkali salts at 45 to 60 days rather than the 24 to 48 hours that is typical with untreated concrete slabs was noted. The longer cure time associated with the concrete slabs that were finished using methods and compositions of this disclosure advantageously provided for the absence of differential curing, which is believed to result in less slab curl.

When concrete slabs cure, water will migrate along the path of least resistance. If there is a moisture vapor barrier under the concrete slab, all of the moisture will be released through the surface and the control joints of the concrete slab. One of the benefits of the surfactant quality of a solution or a composition applied to the concrete slab in a method according to the invention is that the solution or composition is believed to act as a wetting agent, ensuring that the concrete slab will stay wet longer. An additional benefit of the solution or composition is that it is believed not to allow the concrete slab to harden until the water level has decreased significantly enough as to allow the colloidal silica to precipitate out of suspension. In this scenario, the amorphous silica in the solution or composition at the surface at the time of placement of the concrete slab may follow the water into the concrete slab as the relative humidity (RH) of the concrete slab decreases. This may increase the rate of penetration of the amorphous silica particles into the concrete slab, resulting in a much denser, harder concrete slab. While not intending to be limited to any one theory, it is believed that the amorphous silica densifies the concrete slab by placing an insoluble solid into the voids in the concrete. A solution or composition described herein can also advantageously seal a concrete surface, even in concrete slabs that have fully cured. After applying a solution or a composition of the invention to the surfaces of concrete slabs, moisture loss was found to continue for a longer amount of time after placement of the concrete slabs than without using a solution or a composition of the invention. For example, a cured concrete slab was tested at 6 months using an in-slab moisture test, and the RH of the concrete slab showed 96 to 98 percent RH. A calcium chloride test showed that no (zero) moisture had migrated to the surface of the concrete slab.

An additional feature of some embodiments of the invention is that the surface of the concrete becomes largely transparent.

Although the foregoing description contains many specifics, these should not be construed as limiting the scope of the present invention, but merely as providing illustrations of some embodiments. Similarly, other embodiments of the invention may be devised which do not exceed the scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

What is claimed is:

1. A method for finishing concrete, comprising:
    wetting a surface of concrete with a densifier comprising at least 5% colloidal silica, by weight, and a stabilizer to impart the concrete with a softened surface;
    cutting, honing or planing the softened surface wetted with the densifier to provide a generally flat, planar surface; and
    polishing the generally flat, planar surface.
2. The method of claim 1, wherein wetting the surface includes soaking the surface with the densifier.
3. The method of claim 2, further comprising:
    soaking the surface with water or an aqueous solution before wetting the surface with the densifier.
4. The method of claim 1, wherein cutting, honing or planing the softened surface comprises grinding the softened surface.
5. The method of claim 1, further comprising:
    applying another quantity of the densifier to the generally flat, planar surface.
6. The method of claim 5, wherein applying the another quantity of the densifier comprises applying colloidal silica to the generally flat, planar surface.
7. The method of claim 5, wherein applying the another quantity of the densifier comprises applying a densifier comprising a metal silicate or a polysilicate to the generally flat, planar surface.
8. The method of claim 5, wherein polishing is effected while the another quantity of the densifier wets the generally flat, planar surface.
9. The method of claim 1, wherein polishing is repeated at least once with finer abrasives.
10. The method of claim 1, wherein wetting comprises wetting a surface of fully cured concrete.
11. The method of claim 1, wherein wetting comprises wetting a stained surface.
12. The method of claim 1, wherein wetting comprises wetting a hardened surface of new concrete.

13. A method for finishing concrete, comprising:
   wetting a surface of concrete with a densifier comprising at least 5% colloidal silica, by weight, and a stabilizer to impart the concrete with a softened surface;
   cutting, honing or planing the softened surface while the softened surface is wetted with the densifier to provide a planar surface;
   applying additional densifier to the planar surface; and
   polishing the planar surface while the planar surface is wetted with the additional densifier.

14. The method of claim 13, wherein wetting the surface includes soaking the surface of the concrete with the densifier.

15. The method of claim 14, further comprising:
   soaking the surface with water or an aqueous solution before wetting the surface of the concrete with the densifier.

16. The method of claim 13, wherein cutting, honing or planing the softened surface comprises grinding the softened surface.

17. The method of claim 13, wherein applying the additional densifier to the planar surface comprises applying a densifier comprising colloidal silica to the planar surface.

18. The method of claim 13, wherein applying the additional densifier to the planar surface comprises applying a densifier comprising a metal silicate or a polysilicate to the planar surface.

19. The method of claim 13, wherein wetting comprises wetting a surface of fully cured concrete.

20. The method of claim 13, wherein wetting comprises wetting a hardened surface of new concrete.

* * * * *